(12) United States Patent
Pollack et al.

(10) Patent No.: US 11,220,898 B2
(45) Date of Patent: Jan. 11, 2022

(54) AUTOMATED WELL-LOG CORRELATION USING DESCRIPTORS

(71) Applicant: LANDMARK GRAPHICS CORPORATION, Houston, TX (US)

(72) Inventors: Ahinoam Pollack, Stanford, CA (US); Yang Peng, Austin, TX (US); Kainan Wang, Houston, TX (US); Ming-Kang Shih, Houston, TX (US); Krisha Hansel Tracy, Cypress, TX (US); Jesse Mathias Lomask, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 85 days.

(21) Appl. No.: 16/479,900

(22) PCT Filed: Mar. 31, 2017

(86) PCT No.: PCT/US2017/025405
§ 371 (c)(1),
(2) Date: Jul. 22, 2019

(87) PCT Pub. No.: WO2018/182691
PCT Pub. Date: Oct. 4, 2018

(65) Prior Publication Data
US 2019/0383133 A1 Dec. 19, 2019

(51) Int. Cl.
*E21B 47/022* (2012.01)
*E21B 47/12* (2012.01)
(52) U.S. Cl.
CPC ............ *E21B 47/022* (2013.01); *E21B 47/12* (2013.01)

(58) Field of Classification Search
CPC ........ E21B 47/022; E21B 47/12; E21B 47/00; E21B 47/026; G01V 99/005; G01V 1/40; G01V 3/18
See application file for complete search history.

(56) References Cited

U.S. PATENT DOCUMENTS

| | | | |
|---|---|---|---|
| 7,280,932 B2 | 10/2007 | Zoraster et al. | |
| 2006/0052937 A1 | 3/2006 | Zoraster et al. | |

(Continued)

FOREIGN PATENT DOCUMENTS

| | | | | |
|---|---|---|---|---|
| WO | 2010002601 A2 | 1/2010 | | |
| WO | 2016011384 A1 | 1/2016 | | |
| WO | WO-2017135972 A1 * | 8/2017 | ............. E21B 41/00 |

OTHER PUBLICATIONS

FR1850816, "Office Action", dated Mar. 27, 2018, 2 pages.
(Continued)

*Primary Examiner* — Natalie Huls
*Assistant Examiner* — Michael J Singletary
(74) *Attorney, Agent, or Firm* — Kilpatrick Townsend & Stockton LLP

(57) ABSTRACT

Well logs can be automatically correlated using dynamic warping with descriptors. For example, a computing device can receive user input indicating a manual correlation between a first node in a first well-log and a second node in a second well-log. The computing device can use the manual correlation to automatically determine a combination of descriptors usable to correlate the first node to the second node. The computing device can then perform dynamic warping on other well logs using the combination of descriptors determined by using the first well log and the second well log. This may provide more accurate correlations between well logs.

20 Claims, 9 Drawing Sheets

(56) References Cited

U.S. PATENT DOCUMENTS

| | | | |
|---|---|---|---|
| 2010/0307742 A1 | 12/2010 | Phillips et al. | |
| 2014/0081613 A1 | 3/2014 | Dommisse et al. | |
| 2014/0100833 A1 | 4/2014 | Williams et al. | |
| 2014/0316706 A1* | 10/2014 | Grant .................. | G01V 1/362 702/11 |
| 2015/0088424 A1* | 3/2015 | Burlakov ............. | G01V 99/00 702/6 |
| 2015/0120195 A1 | 4/2015 | Dong et al. | |
| 2015/0300150 A1 | 10/2015 | Burkay | |
| 2015/0377003 A1 | 12/2015 | Benson et al. | |
| 2016/0334542 A1 | 11/2016 | Chiu et al. | |

OTHER PUBLICATIONS

GITHUB, "Machine learning contest", https://github.com/seg/2016-ml-contest, Oct. 2016, 5 pages.

Hall, "No secret codes: announcing the winners", https://agilescientific.com/blog/2017/2/2/no-secret-codes, Feb. 2, 2017, 4 pages.

Mirowski, et al., "New Software for Well-to-Well Correlation of Spectroscopy Logs", Schlumberger, available to the public at least as early as Mar. 10, 2017, 3 pages.

PCT/US2017/021361, "International Search Report and Written Opinion", dated Dec. 8, 2017, 16 pages.

PCT/US2017/025405, "International Search Report and Written Opinion", dated Dec. 27, 2017, 20 pages.

Wheeler, "Automatic and Simultaneous Correlation of Multiple Well Logs", 2015, 48 pages.

Zhao, et al., "shapeDTW: shape Dynamic Time Warping", Jun. 6, 2016, 3 pages.

GB Application No. GB1910860.4 , "First Examination Report", dated Sep. 16, 2021, 4 pages.

GB. Application No. GB1911265.5 , Notice of Decision to Grant, dated Sep. 21, 2021, 2 pages.

* cited by examiner

US 11,220,898 B2

AUTOMATED WELL-LOG CORRELATION USING DESCRIPTORS

TECHNICAL FIELD

The present disclosure relates generally to methods and devices for well logging or borehole study. More specifically, but not by way of limitation, this disclosure relates to automated well-log correlation using descriptors.

BACKGROUND

A well system (e.g., for extracting oil or gas) can include multiple wellbores drilled through a subterranean formation. Each wellbore can have a well logging tool that provides data in the form of a well log back to a well operator. A well log can be a record indicative of the subterranean strata that are penetrated at various depths by a wellbore. The well operator can manually review the well logs to identify strata or other features of interest in the subterranean formation. For example, the well operator can manually review multiple well logs in a two-dimensional (2D) cross-sectional view or a three-dimensional (3D) view to identify structures or features of interest.

DETAILED DESCRIPTION

Figure 1:
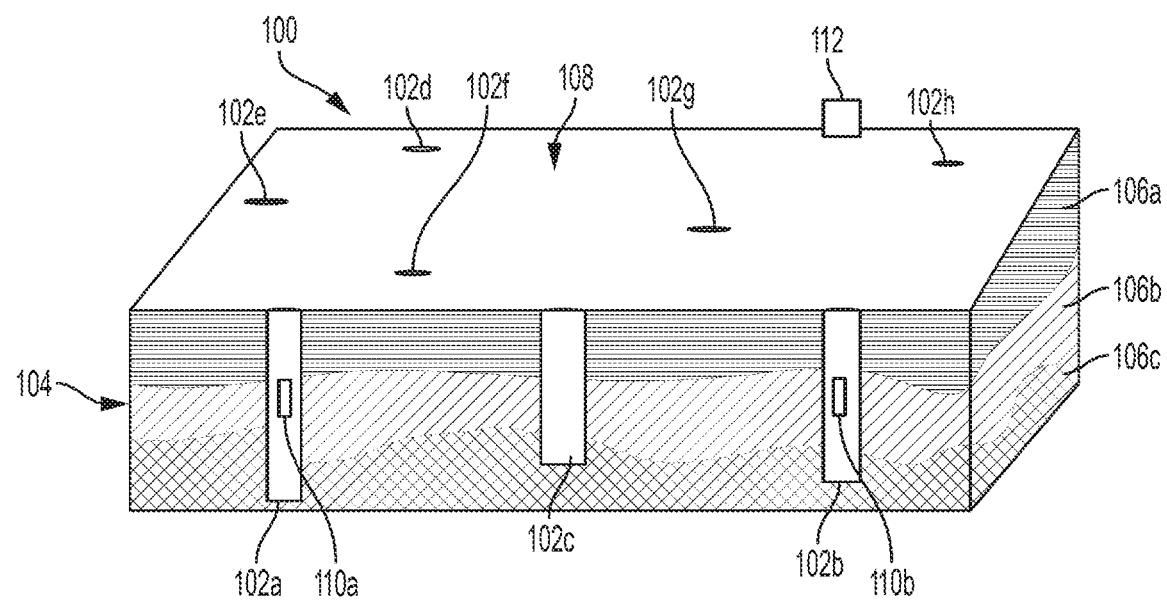
FIG. 1 is a cross-sectional side view of an example of a well system for obtaining well logs according to some aspects.

Certain aspects and features of the present disclosure relate to correlating (e.g., aligning) well logs by performing dynamic warping using descriptors. Dynamic warping can include shifting, squeezing, and stretching two well-logs to attempt to align the well logs with one another. Descriptors can be information present in a pattern, shape, frequency, magnitude, or other characteristic of data surrounding a node (data point) of interest in a well log. As a particular example, a computing device can identify descriptors related to each node in a first well-log and descriptors related to each node in a second well-log. The computing device can then perform dynamic warping using the descriptors to determine an alignment between the well logs. For example, the computing device can perform the dynamic time warping at least in part by comparing the descriptors related to each node in the first well-log to the descriptors related to each node in the second well-log. The resulting alignment between the well logs may be more accurate than alignments determined using other methods. For example, the resulting alignment may be more accurate than is achievable by simply comparing the magnitude of each node in the first well-log to the magnitude of each node in the second well-log. Performing dynamic warping using descriptors can leverage more information from the well logs to perform the well-log correlation, thereby providing more informed and accurate results.

In some examples, dynamic warping can be performed using multiple descriptors for each node. And each descriptor can have one or more configurable parameters, a configurable weight, or both of these. It can be difficult and time consuming to manually identify a combination of descriptors, parameter values, and weights that result in a sufficiently accurate alignment between two well-logs. Some examples of the present disclosure can overcome one or more of the abovementioned issues by automatically (i) generating various combinations of descriptors, parameters, and weights; (ii) performing dynamic warping on two well-logs using the various combinations; and (iii) identifying which combination results in the most accurate alignment between the two well-logs.

For example, the computing device can receive a selection of two well-logs. The computing device can then receive user input indicating a node in one of the well logs that is correlated to another node in another of the well logs. This manually determined correlation can be referred to as a manual correlation. Thereafter, the computing device can generate (e.g., randomly) multiple different combinations of descriptors, parameters, and weights. The computing device can perform dynamic warping on the two well-logs using all of the different combinations to identify which combination results in a correlation that is most similar to the manual correlation. The computing device can use that combination as a champion combination. The computing device can then correlate nodes in other well logs by performing dynamic warping using the champion combination.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional side view of an example of a well system 100 for obtaining well logs according to some aspects. The well system 100 includes multiple wellbores 102a-h drilled through a subterranean formation 104. The wellbores 102a-h extend from the well surface 108 into strata 106a-c of the subterranean formation 104. The strata 106a-c can include different materials (e.g., rock, soil, oil, water, or gas) and vary in thickness and shape.

Some or all of the wellbores 102a-h can include well tools, such as logging tools 110a-b, for generating the well logs. Each of the well tools can measure properties of the rocks, fluid, or other contents of the strata 106a-c and use the measured properties to generate a respective well log. For example, the logging tool 110a can measure the electrical, acoustic, radioactive, electromagnetic, or pressure properties of the strata regions proximate to wellbore 102a. The logging tool 110a can then use the measurements to generate a well log. A separate well log can be generated for each of the wellbores 102a-h.

The well tools can electronically communicate the well logs to a computing device 112, which can be positioned onsite (as shown in FIG. 1) or offsite. The well tools can electrically communicate with the computing device 112 via a wired or wireless interface. In some examples, the well tools can electronically communicate the well logs to the computing device 112 indirectly, such as over the Internet or another network.

Figure 2:
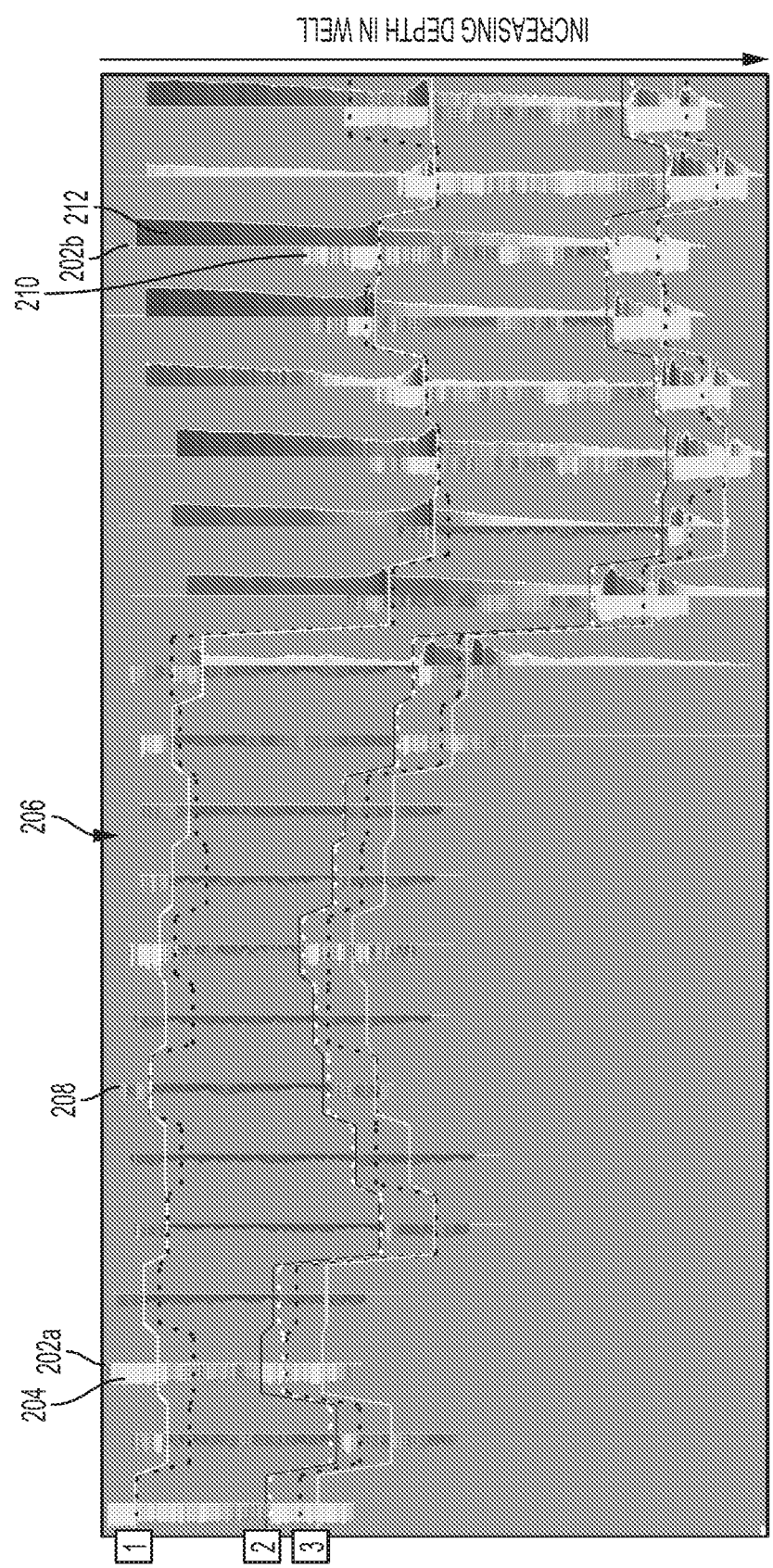
FIG. 2 is a graph of an example of strata surfaces that have been correlated among multiple well-logs via manual correlation and automated correlation according to some aspects.

The computing device 112 can display some or all of the well logs as two-dimensional (2D) or three-dimensional (3D) figures. One example of such a figure is shown in FIG. 2. In FIG. 2, each vertical line represents a single wellbore. For example, vertical line 202a represents a particular wellbore. Because there are 21 vertical lines, there are 21 different wellbores represented in this figure. The portion of the line 202a near the top 206 of the figure represents the portion of the wellbore near the well surface, with the depth of the wellbore increasing down the page. The patterned data to the left of a vertical line is a well log. For example, patterned data 204 is a well log corresponding to the wellbore represented by line 202a. A peak, trough, or change in shading in the patterned data 204 can represent the changing composition of the strata in the subterranean formation.

In FIG. 2, the nine rightmost vertical lines have two corresponding well logs—one well log to the left and another well log to the right. For example, the vertical line 202b has one well log 210 to the left and another well log 212 to the right. These well logs are from the same wellbore (represented by vertical line 202b), but generated using different methods. For example, well log 210 may be generated based on gamma radiation emitted from the strata in the subterranean formation, and well log 212 may be generated based on the spontaneous potential of the strata in the subterranean formation. The computing device 112 can output any number and combination of well logs individually or concurrently.

In the example shown in FIG. 2, all of the well logs are from wellbores that are part of the same well system and penetrate the same strata. So, all of the well logs provide information about the same strata. But because the strata are nonuniform, the wellbores are in different locations within the well system, and the wellbores have different depths, the well logs do not all perfectly align with one another. For example, the grooves and troughs representing a particular stratum in well log 208 may be closer to the top 206 of FIG. 2 than the grooves and troughs representing the same stratum in well log 210. It may be desirable to identify and correlate a single stratum across multiple well logs.

A geologist may manually review the well logs and identify the same stratum in each well log. The geologist can then correlate the same stratum across the well logs. Examples of manually identified and correlated strata are shown as solid lines in FIG. 2. The first solid line (extending from box "1" on the left) can represent the upper surface of a first stratum. The second solid line (extending from box "2" on the left) can represent the upper surface of a second stratum. And the third solid line (extending from box "3" on the left) can represent the upper surface of a third stratum. But manually reviewing and correlating surfaces of strata among multiple well logs can be expensive, time consuming, challenging, and subjective. A geologist may spend several days identifying and correlating thousands surfaces across dozens of well logs.

In some examples, the computing device 112 can execute a software application to identify and correlate strata across multiple well logs in a more automated manner. This can be referred to as automated correlation. For example, the computing device 112 can analyze each of the well logs, identify the various strata in the well logs, and correlate the strata to one another, all with little or no manual intervention. Examples of strata surfaces correlated in such a manner by the computing device 112 are shown as dashed lines in FIG. 2. The first dashed line (extending from box "1" on the left) can represent the upper surface of a first stratum. The second dashed line (extending from box "2" on the left) can represent the upper surface of a second stratum. And the third dashed line (extending from box "3" on the left) can represent the upper surface of a third stratum. Automated correlation can be faster, more consistent, require less processing time, and require less power usage than manual correlation.

Figure 3A:
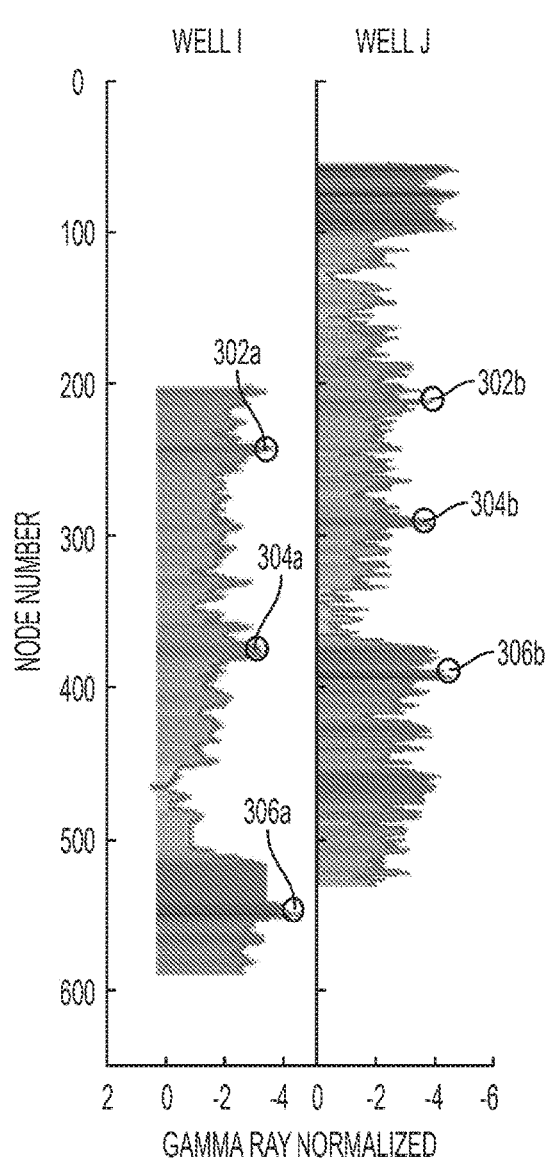
FIG. 3A is a graph of an example of well logs prior to dynamic warping according to some aspects.
Figure 3B:
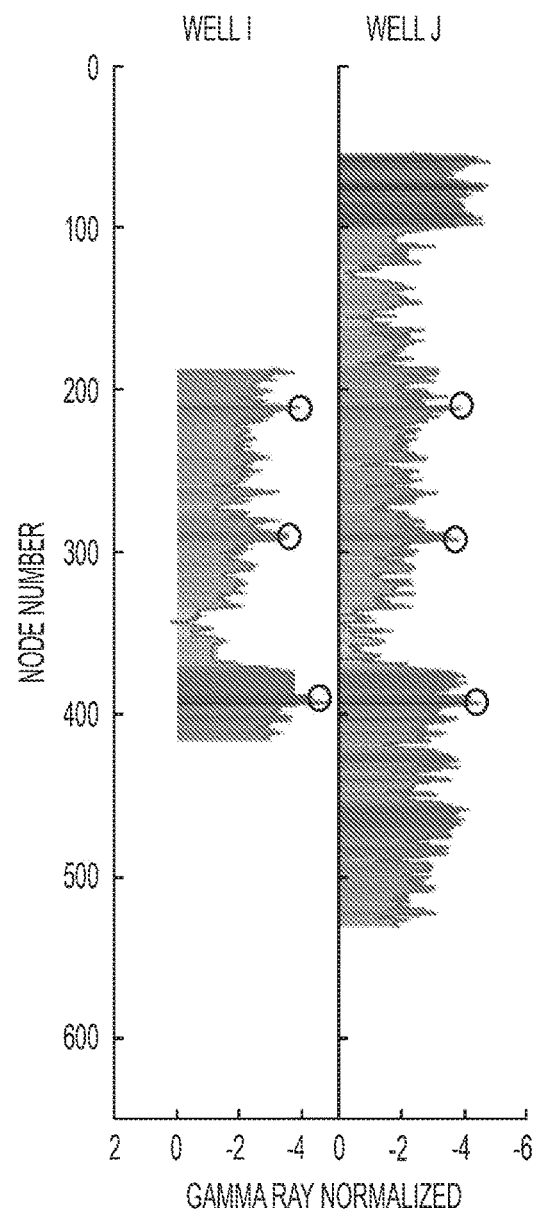
FIG. 3B is a graph of an example of well logs after dynamic warping according to some aspects.

In some examples, the computing device 112 can perform automated correlation using dynamic warping. An example of dynamic warping is dynamic time warping. Dynamic warping can include shifting, squeezing, and stretching two well-logs to attempt to align the well logs with one another. An example of dynamic warping is shown in FIGS. 3A-3B. FIG. 3A shows an example of two well-logs for two wells, Well I and Well J, before dynamic warping. The subterranean depths associated with nodes in the well logs are expressed along the Y-axis. The magnitudes of the nodes are expressed along the X-axis. In FIG. 3A, the two well-logs are misaligned with one another. For example, sets of nodes 302a-b, 304a-b, and 306a-b are misaligned with one another. FIG. 3B shows an example of the well logs after dynamic warping. As shown, the well log for Well I has been squeezed and shifted to align it with the well log for Well J. For example, the abovementioned nodes (shown circled) are now aligned with one another. After aligning the two well-logs with one another, correlations between the various nodes (e.g., between node 302a and node 302b, between node 304a and node 304b, and between node 306a and node 306b) can be determined.

Dynamic warping can include comparing the magnitudes of the nodes in the well log for Well I to the magnitudes of the nodes in the well logs for Well J. For example, the magnitude of node 302a can be compared to the magnitude of each respective node in the well log for Well J. Dynamic warping can also include creating an error matrix expressing the respective difference between node 302a and each respective node in the well log for Well J. This process can be iterated for all of the nodes in the two well-logs, with each iteration resulting in more information being added to the error matrix. After creating the error matrix, a path through the error matrix with the lowest possible mean error can be determined. The path can be correlated nodes between the two well-logs. Every point in the path can be a correlation between a node in the well log for Well I and another node in the well log for Well J. The computing device 112 can perform dynamic warping at least in part to implement an automated correlation process.

Dynamic warping that is implemented by only comparing the magnitudes of nodes in well logs to one another, however, may not always provide ideal results. For example, referring back to FIG. 2, the dashed lines represent automated correlations generated using this type of dynamic warping. And the solid lines represent manual correlations. It can be seen that the dashed lines deviate from the solid lines in some locations. These deviations can represent errors between the automated correlations and the manual correlations.

Some examples of the present disclosure can provide more accurate automated correlations by additionally or alternatively taking into account other information related to well log nodes when performing dynamic warping. For example, the computing device 112 can analyze every node in a set of well logs and tag each node with additional information that describes the node's surrounding shape, the magnitudes of neighboring nodes, an average of the magnitudes of the neighboring nodes, a frequency of the magnitudes of the neighboring nodes, or any combination of these. Each piece of additional information can be referred to as a descriptor, because it describes a characteristic of the node. Then, rather than only comparing the magnitudes of two nodes during dynamic warping, the computing device 112 can additionally or alternatively compare the descriptors for the nodes. This can result in a more accurate correlation between the two nodes, and thus a more accurate correlation between the set of well logs.

Figure 4A:
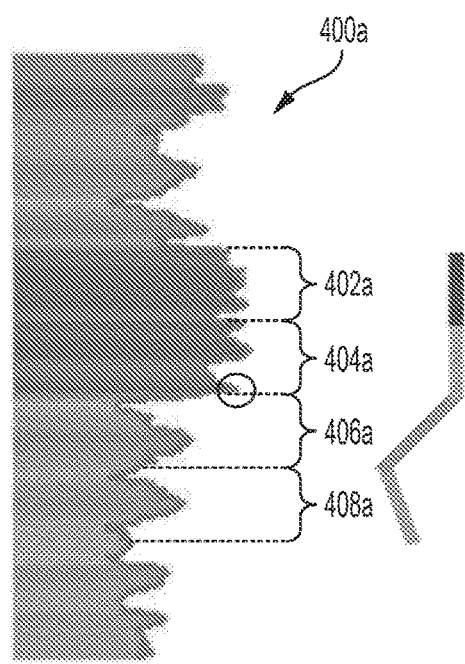
FIG. 4A is a graph of an example of a shape descriptor associated with a node in one well log according to some aspects.
Figure 4B:
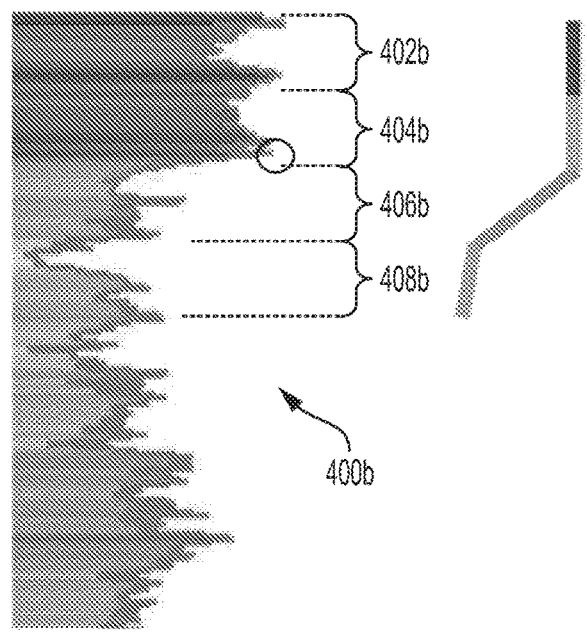
FIG. 4B is a graph of an example of another shape descriptor associated with another node in another well log according to some aspects.

One example of a descriptor can be a shape descriptor. A shape descriptor can indicate a shape of data surrounding (before, after, or both of these) a node of interest in a well log. For example, the shape descriptor can indicate one or more slopes (e.g., gradients) in data surrounding a node of interest in a well log. One example of a shape descriptor is shown in FIGS. 4A-4B. In FIG. 4A, the computing device 112 has identified a node of interest in a well log. The node of interest is circled. The computing device 112 can then divide a predetermined number of nodes in the area surrounding the node of interest into a predetermined number of segments, which in this example is four segments 402a-408a. The computing device 112 can then determine the slope of the nodes in each segment. For example, the computing device 112 can determine the slope of all the nodes in segment 402a by performing a linear regression through the nodes in the segment 402a. The computing device 112 can repeat this process for segments 404a-408a. Visual representations of the slopes for the segments 402a-408a are shown in FIG. 4A to the right of the segments 402a-408a. The computing device 112 can then associate some or all of the slopes with the node of interest. In some examples, each individual slope can be a separate shape-descriptor for the node of interest. In other examples, two or more of the slopes can collectively represent a shape descriptor for the node of interest. For example, a single shape-descriptor for the node of interest can include all four slopes for segments 402a-408a. The computing device 112 can repeat the abovementioned process for some or all of the nodes in the well log 400a.

After determining the shape descriptors for the nodes in the well log 400a, the computing device 112 can perform dynamic warping at least in part by comparing the shape descriptor for each node in well log 400a to the shape descriptor for each node in well log 400b of FIG. 4B. For example, the computing device 112 can compare the shape descriptor for the node of interest in well log 400a to the shape descriptor for the node of interest in well log 400b. It can be seen in FIGS. 4A-B that the shape descriptors for these two nodes of interest are substantially similar, which may result the computing device 112 identifying a correlation between these two nodes. This may result in a more accurate correlation between well logs 400a-b than if, for example, only the magnitudes of the nodes of interest were compared to one another (e.g., because the magnitudes of the nodes of interest in FIGS. 4A-B are significantly different from one another).

Another example of a descriptor is an average descriptor. The average descriptor can indicate average values of the magnitudes of nodes surrounding a node of interest in a well log. For example, the computing device 112 can divide a predetermined number of nodes in the area surrounding the node of interest into a predetermined number of segments, such as segments 402a-408a. The computing device 112 can then determine a respective average of the magnitudes of the nodes in each segment. In some examples, each individual average can be a separate average-descriptor for the node of interest. In other examples, two or more of the averages can collectively represent an average descriptor for the node of interest. For example, a single average-descriptor for the node of interest can include all four averages for segments 402a-408a.

Another example of a descriptor is a magnitude descriptor. The magnitude descriptor can indicate the magnitudes of nodes surrounding a node of interest in a well log. For example, the magnitude descriptor can indicate one or more magnitudes of a predetermined number of nodes surrounding the node of interest.

Another example of a descriptor is a histogram descriptor. The histogram descriptor can indicate frequencies in which slopes of nodes that surround a node of interest fall into predesignated slope ranges. For example, the computing device 112 can identify a predetermined number of nodes in the area surrounding the node of interest. The computing device 112 can determine the slope of each of those nodes. In some examples, the computing device 112 can determine a slope of a node by determining a central gradient of the node according to the following equation:

$$Slope_{node\_i} = \frac{value_{node_i+1} + value_{node_i-1}}{2*(\text{Distance Between Nodes})}$$

where $Slope_{node\_i}$ is the slope across node i; $value_{node_i+1}$ is the value of node i+1; $value_{node_i-1}$ is the value of node i−1; and the Distance Between Nodes is the distance between node i+1 and node i−1 (e.g., with a depth spacing of half a foot between nodes, the distance between node i+1 and node i−1 would be 1 ft). The computing device 112 can also determine bins (e.g., slope ranges) into which to categorize the slops of the nodes. For example, the computing device 112 can determine four bins, where a first bin includes slopes between −40 degrees and −20 degrees, a second bin includes slopes between −20 degrees and 0 degrees, a third bin includes slopes between 0 degrees and 20 degrees, a fourth bin includes slopes between 20 degrees and 40 degrees. The computing device 112 can determine any number of bins, with each bin spanning the same or a different number of degrees. The computing device 112 can then categorize the slopes of the nodes into their corresponding bins, and count how many nodes are in each bin. The number of nodes in each bin can be referred to as a bin value. For example, the computing device 112 can determine that three nodes are in the first bin, so the first bin can have a bin value of three. The computing device 112 can determine that one node is in the second bin, so the second bin can have a bin value of one. The computing device 112 can determine that two nodes are in the third bin, so the third bin can have a bin value of two.

The histogram descriptor for the node of interest can indicate some or all of these bin values.

Another example of a descriptor is an error descriptor. The error descriptor can indicate an error between the magnitudes of nodes of interest in two different well-logs. The computing device 112 can determine the error between the nodes of interest according to the following equation:

$$error = |node_i - node_j|^{power}$$

where $node_i$ is the node of interest in one well log, $node_j$ is the node of interest in the other well log, and power is a predetermined exponential value. The error descriptor can reduce or exaggerate an effect of outliers.

Figure 5:
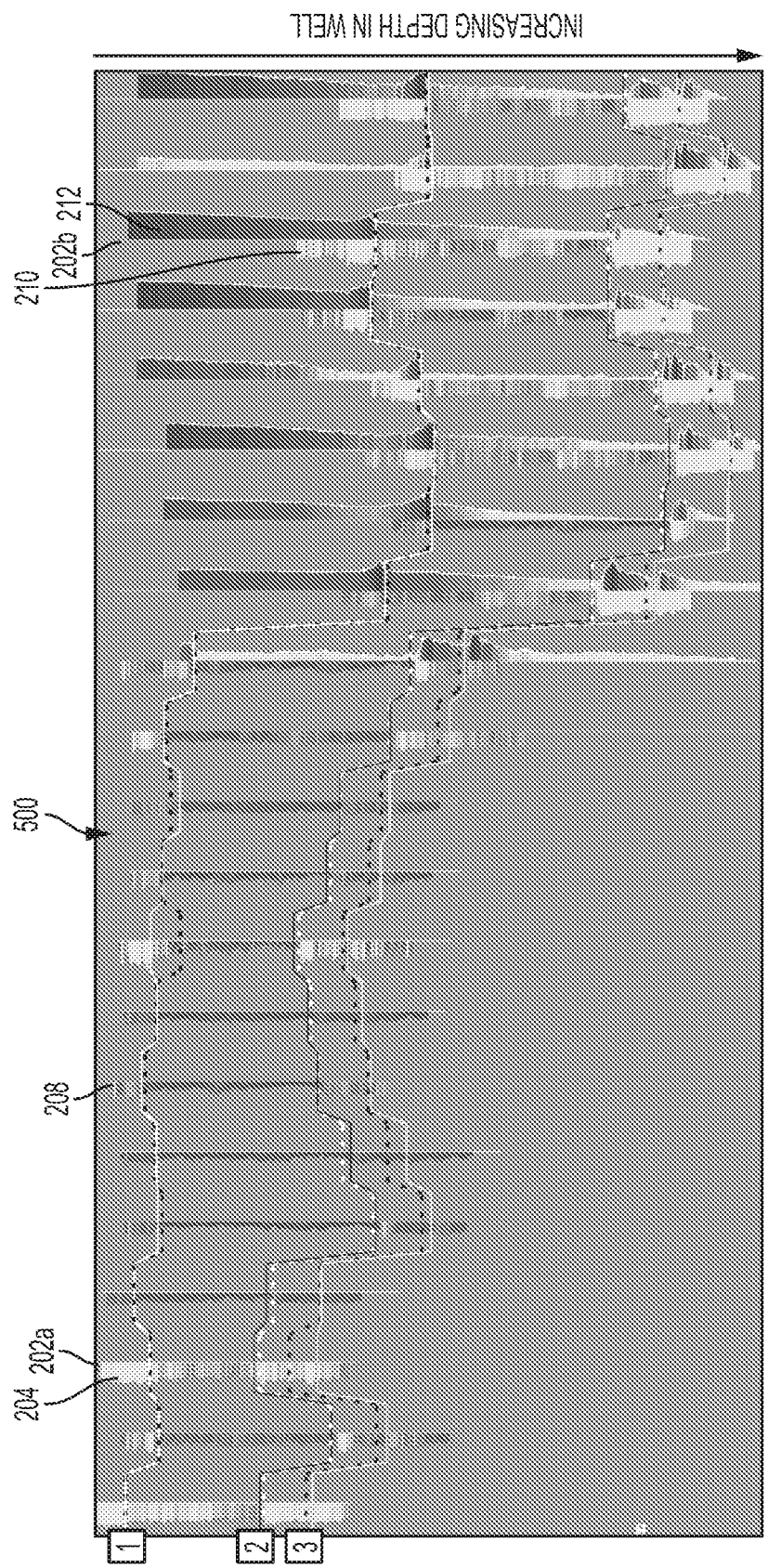
FIG. 5 is a graph of an example of strata surfaces that have been correlated using dynamic warping with descriptors according to some aspects.

The computing device 112 can determine and use any number and combination of descriptors for correlating well logs. For example, the computing device 112 can use shape descriptors, magnitude descriptors, average descriptors, histogram descriptors, error descriptors, or any combination of these (additionally or alternatively to the magnitudes of the nodes) to correlate well logs. This may result in a more accurate correlation. For example, FIG. 5 shows the same well logs as FIG. 2, with the dashed lines representing automated correlations generated using dynamic warping with descriptors. The solid lines represent manual correlations. The dashed lines are significantly closer to the solid lines than in FIG. 2, which may mean that the automated correlations are more accurate.

In some examples, the computing device 112 can associate weights with the different descriptors for improving the accuracy of the correlation between well logs. For example, a shape-descriptor match may be a more reliable indication of a correlation between nodes in well logs than a magnitude-descriptor match. So, the computing device 112 may assign shape descriptors a higher weight than magnitude descriptors. The computing device 112 can take the weights for the descriptors into account when performing well-log correlation.

It can be challenging to manually select descriptors, parameters for each descriptor, and a weight for each descriptor because of the large number of descriptors and parameters involved. For example, the shape descriptor can have a node-number parameter, a node-location parameter, a segment-number parameter, a segment-size parameter, or any combination of these. The node-number parameter can indicate how many surrounding nodes (e.g., nodes surrounding a node of interest) are to be divided into segments. The node-location parameter can indicate if the surrounding nodes are to be located before the node of interest, after the node of interest, or both. The segment-number parameter can indicate how many segments to divide the surrounding nodes into. The segment-size parameter can indicate the number of nodes per segment (there may be overlapping segments). Varying each of these parameters can affect the accuracy of a well-log correlation. As another example, the average descriptor can have a node-number parameter, a node-location parameter, a segment-number parameter, a segment-size parameter, or any combination of these. As still another example, the magnitude descriptor can have a node-number parameter, a node-location parameter, or both of these. As still another example, the histogram descriptor can have a node-number parameter, a node-location parameter, a bin-number parameter indicating how many bins to categorize the slopes of nodes into, a slope-type parameter, or any combination of these. Furthermore, each of these descriptors can have an associated weight. As yet another example, the error descriptor can have an exponent parameter for the exponential value in the abovementioned equation. It can be difficult, time consuming, and costly for a user to attempt to manually determine appropriate parameters and weights for each descriptor to provide accurate well-log correlation results.

Figure 6:
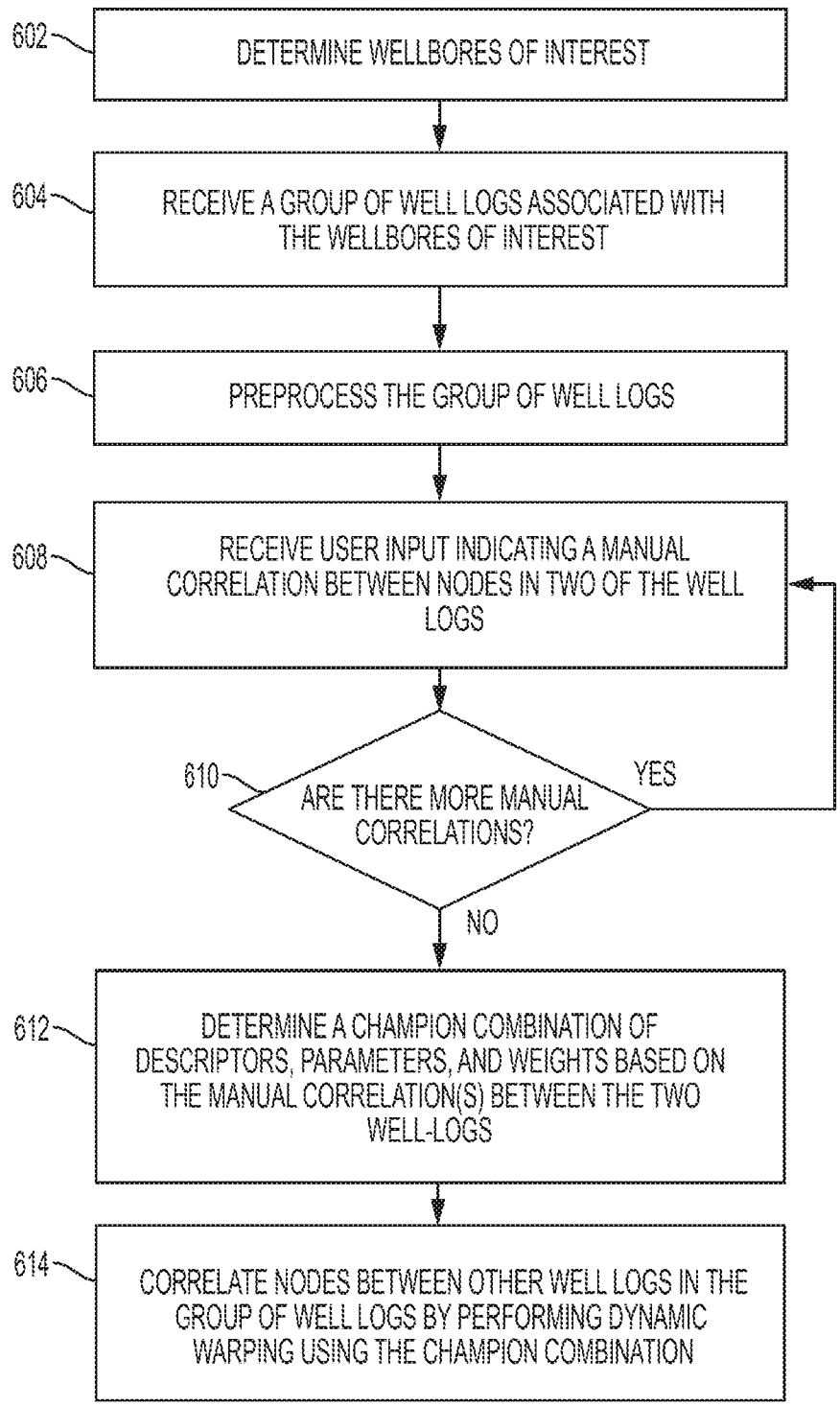
FIG. 6 is a flow chart of an example of a process for automated well-log correlation using descriptors according to some aspects.

Some examples of the present disclosure can overcome one or more of the above issues by automatically selecting one or more descriptors, parameters for the descriptor(s), and/or weights for the descriptors for use in performing well-log correlation. An example of a flow chart of a process for automatically selecting such information is shown in FIG. 6. In other examples, the process can be implemented using more steps, fewer steps, different steps, or a different order of the steps depicted in FIG. 6.

Referring now to FIG. 6, in block 602, the computing device 112 determines wellbores of interest. The computing device 112 can determine the wellbores of interest based on user input indicating the wellbores of interest. For example, the computing device 112 may display graphical user interface (GUI) having a visual representation of multiple wellbores in a well system. The computing device 112 can receive, as user input, a selection of some or all of the wellbores displayed in the GUI. In some examples, the wellbores need not be selected or ordered according to a depositional dip line. The computing device 112 can receive the user input via a user input device. The computing device 112 can use the selected wellbores as the wellbores of interest.

In block 604, the computing device 112 receives a group of well logs associated with the wellbores of interest. For example, the computing device 112 can retrieve the well logs from a local memory device. In another example, the computing device 112 can communicate with a remote server to retrieve the well logs from a remote database.

In block 606, the computing device 112 preprocesses the group of well logs corresponding to the wellbores of interest. The computing device 112 can perform one or more operations to preprocess the well logs.

In some examples, the computing device 112 can preprocess the well logs by normalizing the well logs so that the well logs can be compared to one another. For example, all of the well logs may not have a uniform range of values. To make the well logs comparable, the computing device 112 can manipulate the well logs so that all of the well logs have the same range of values. As a particular example, a spontaneous-potential well log often does not have a standard range of values. So, to compare two spontaneous-potential well logs, the computing device 112 can normalize the two well logs so they both have the same range of values.

In some examples, the computing device 112 can preprocess the well logs by smoothing the well logs. For example, well logs can have high-frequency noise. The computing device 112 can smooth the well logs to reduce or eliminate the influence of the high frequency noise. For example, the computing device 112 can divide the well log into intervals of a predetermined amount of nodes (e.g., intervals of five nodes). The computing device 112 can determine a mean value of the nodes in an interval and assign all the nodes in the interval the mean value. The computing device 112 can repeat this process for all the intervals, thereby smoothing the well log. This can help reduce the influence of high-frequency noise in the well-log correlation process.

In some examples, the computing device 112 can preprocess the well logs by removing a trend from the well logs. A trend can include an increase or decrease in the values of a well log with depth. A trend may occur due to malfunctioning of the well tool that generated the well log or some other non-geological phenomenon. The computing device 112 can remove a trend from a well log to reduce errors associated with the trend.

In some examples, the computing device 112 may not preprocess the well logs. Rather, the computing device 112 may use the well logs in their raw form to perform some or all of the remaining steps described below.

Figure 7:
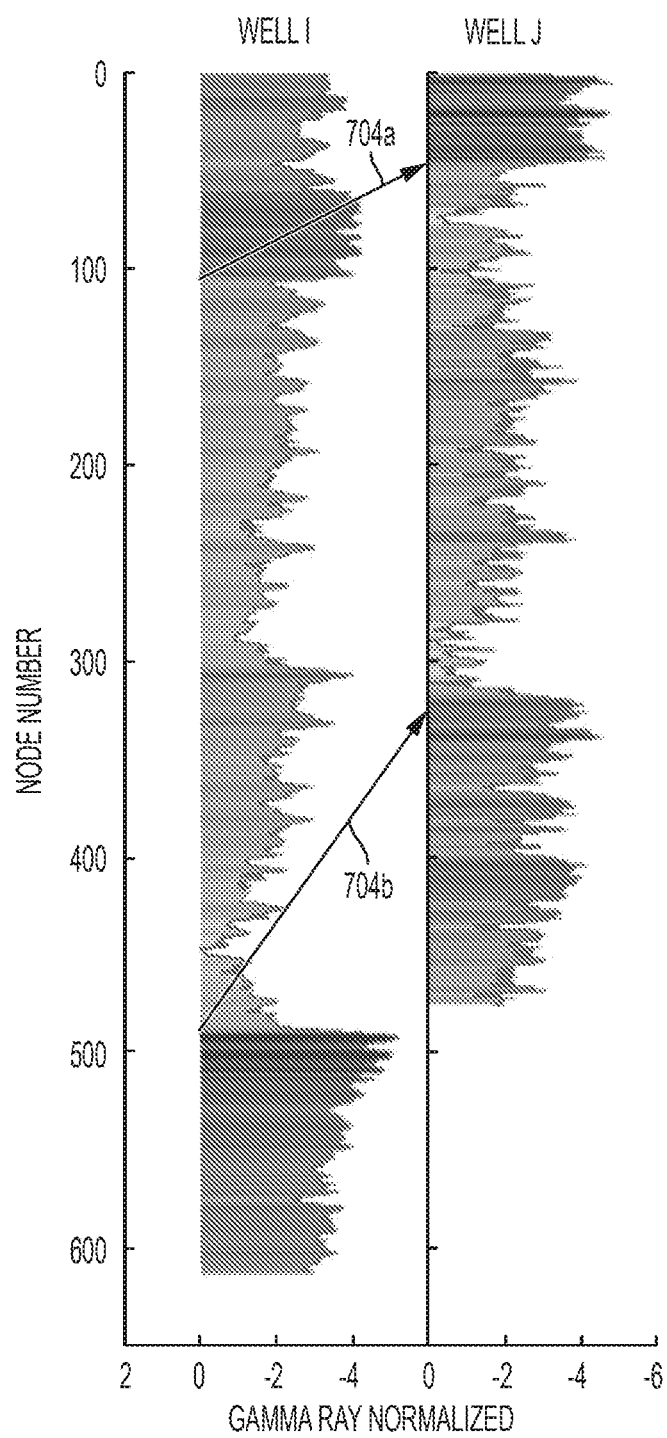
FIG. 7 is a graph of an example of manually correlated nodes in well logs according to some aspects.

In block 608, the computing device 112 receives user input indicating a manual correlation between nodes in two of the well logs. In some examples, the computing device 112 can receive user input indicating a manual correlation between a first node in a first well-log in the group of well logs and a second node in a second well-log in the group of well logs. As a particular example, the computing device 112 may display the two well-logs adjacent to one another, similar to FIG. 7. A user can manipulate a mouse or another user input device to select the first node in Well I and the second node in Well J. The computing device 112 can receive the user input and, based on the user input, determine that a correlation exists between the first node in Well I and the second node in Well J. An example of such a correlation is represented by arrow 704*a*.

In block 610, the computing device 112 determines if there are any more manual correlations to be input. For example, the automated-correlation software may require a minimum number of manual correlations between well logs (e.g., to provide suitably accurate results). If the computing device 112 determines that there are more manual correlations to be input, the process can return to block 608, at which point the user may enter another manual correlation. This second manual correlation can be represented by arrow 704*b* in FIG. 7. Blocks 608-610 can iterate so that the user can enter any number and combination of manual correlations between any number and combination of well logs in the group of well logs. If the computing device 112 determines that there are no more manual correlations to be input, the process can continue to block 612.

In block 612, the computing device 112 determines a champion combination of descriptors, parameters for the descriptor(s), weights for the descriptor(s), or any combination of these based on the manual correlations between the two well-logs. The champion combination can include any number and combination of descriptors, parameters, and weights. In some examples, the computing device 112 can determine the champion combination by performing some or all of the process shown in FIG. 8. In other examples, the process of FIG. 8 can be implemented using more steps, fewer steps, different steps, or a different order of the steps depicted in FIG. 8.

Figure 8:
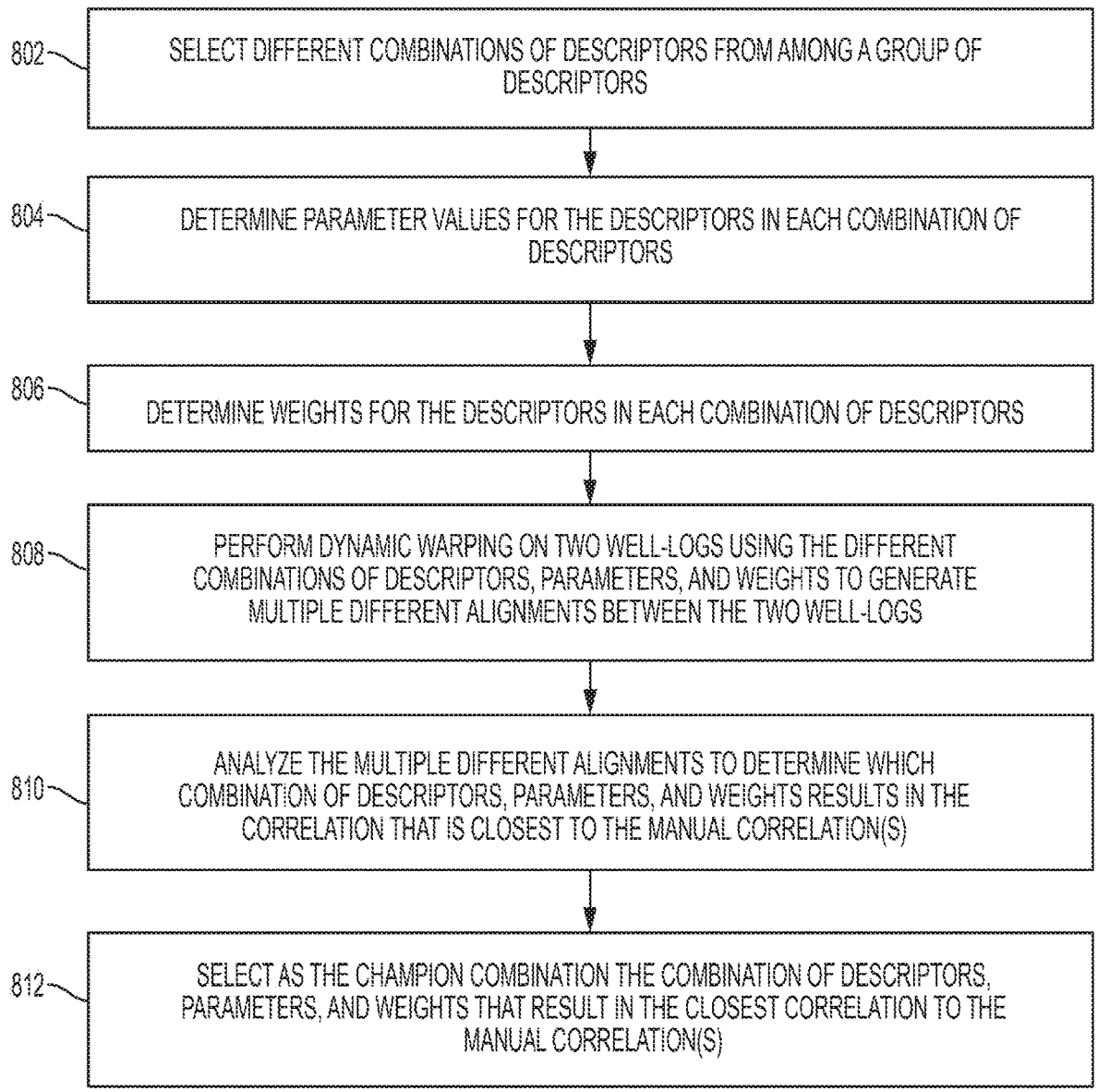
FIG. 8 is a flow chart of an example of a process for determining a champion combination of descriptors, parameters, and weights according to some aspects.

Referring now to FIG. 8, in block 802, the computing device 112 selects different combinations of descriptors from among a group of descriptors. The group of descriptors can include a shape descriptor, a magnitude descriptor, an average descriptor, a histogram descriptor, an error descriptor, or any combination of these.

In some examples, the computing device 112 can select the different combinations of descriptors according to any technique or combination of techniques. For example, the computing device 112 can randomly select the different combinations of descriptors. As another example, the computing device 112 can methodically select the different combinations of descriptors to ensure every possible combination of descriptors is attempted. As yet another example, certain combinations of descriptors may be predesignated as particularly accurate or particularly inaccurate. The computing device 112 can select the combinations predesignated as particularly accurate, skip the combinations predesignated as particularly inaccurate, or both.

In some examples, the computing device 112 can determine an initial combination of descriptors. The computing device 112 can then perform some or all of the remaining steps in FIG. 8 to determine if the initial combination of descriptors matches the manual correlation(s) or is within a predetermined tolerance-range of the manual correlation(s). If so, the initial combination of descriptors can be used as the champion combination. If not, the process can return to block 802, where another combination of descriptors can be selected and the process can be iterated (e.g., until a champion combination of descriptors is identified).

In block 804, the computing device 112 determines parameter values for the descriptors in each combination of descriptors. For example, the computing device 112 can determine values for at least two parameters corresponding to at least one descriptor in a combination of descriptors. As a particular example, the computing device 112 can select values for a node-number parameter, a node-location parameter, a segment-number parameter, and a segment-size parameter corresponding to a shape descriptor in a combination of descriptors.

In some examples, the computing device 112 can randomly select the parameter values for the descriptors. In other examples, the computing device 112 can methodically select the different parameter values to ensure every possible combination of parameter values is attempted. In some examples, certain parameter values or ranges of parameter values may be predesignated as particularly accurate or particularly inaccurate. The computing device 112 can select the parameter values predesignated as particularly accurate, skip the parameter values predesignated as particularly inaccurate, or both.

In block 806, the computing device 112 determines weights for the descriptors in each combination of descriptors. In some examples, the computing device 112 can randomly select the weights for the descriptors. In other examples, the computing device 112 can methodically select the different weights to ensure every possible combination of weights is attempted. In some examples, certain weights may be predesignated as particularly accurate or particularly inaccurate. The computing device 112 can select the weights predesignated as particularly accurate, skip the weights predesignated as particularly inaccurate, or both.

In block 808, the computing device 112 performs dynamic warping on two well-logs using the different combinations of descriptors, parameters, weights, or any combination of these to generate multiple different alignments between the two well-logs. For example, the computing device 112 can perform dynamic warping on the two well-logs using all of the combinations of previously identified descriptors, parameters, and weights. This may result in the multiple different alignments between the two well-logs.

In block 810, the computing device 112 analyzes the multiple different alignments to determine which combination of descriptors, parameters, weights, or any combination of these results in the correlation that is closest to the manual correlation(s). For example, the computing device 112 can compare all of the different alignments to determine that a specific combination of descriptors, parameters, and weights results in the closest correlation to the manual correlation(s) provided in block 608.

In block 812, the computing device 112 selects as the champion combination the combination of descriptors, parameters, and weights that result in the closest correlation to the manual correlation(s). In some examples, the computing device 112 can identify several combinations of descriptors, parameters, and weights that result in correlations that are within a predetermined tolerance-range of the manual correlation(s). The predetermined tolerance-range can be provided as user input. The computing device 112 can select, from among the several combinations, the combination that has the most similar results to the manual correlation(s) as the champion combination.

Returning now to FIG. 6, in block 614, the computing device 112 can correlate nodes between other well logs in the group of well logs by performing dynamic warping using the champion combination (e.g., determined in block 812). For example, the computing device 112 can select a different set of well logs from the group of well logs. The computing device 112 can perform dynamic warping on the different set of well logs using the descriptors, parameters, and weights determined in block 612. This may result in a correlation between the different set of well logs. In some examples, the computing device 112 can repeat this process, for example, to determine correlations between every possible pair of well logs in the group of well logs. These correlations can be referred to as pairwise correlations.

After determining some or all of the pairwise correlations, the computing device 112 can use a regression algorithm on the pairwise correlations to identify a global correlation across all the well logs. The computing device 112 can then determine a surface of a stratum (a "stratum surface") represented in the well logs and correlate the stratum surface across all the well logs in the group of well logs.

Figure 9:
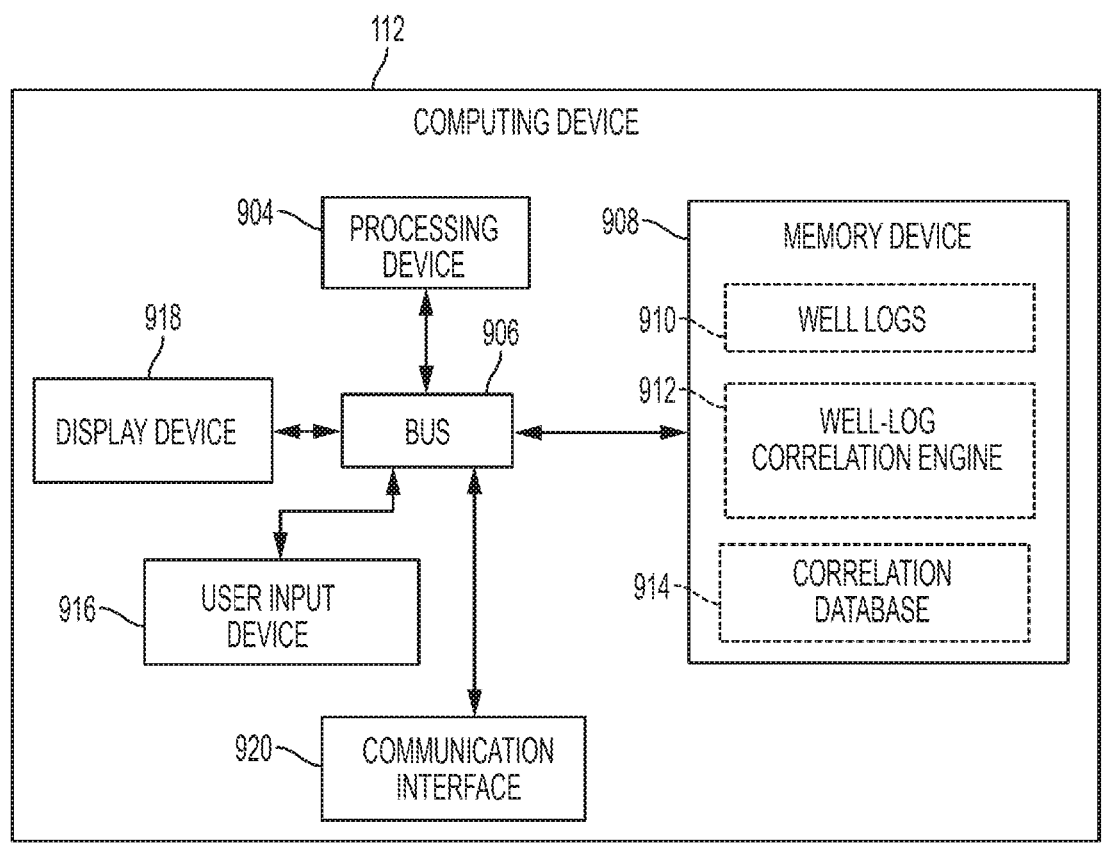
FIG. 9 is a block diagram of an example of a computing device for performing automated well-log correlation according to some aspects.

In some examples, some or all of the abovementioned features can be implemented using the computing device 112 shown in FIG. 9. The computing device 112 can include a processing device 904, a bus 906, a memory device 908, a user input device 916, a display device 918, and a communication interface 920. In some examples, some or all of the components shown in FIG. 9 can be integrated into a single structure, such as a single housing. In other examples, some or all of the components shown in FIG. 9 can be distributed (e.g., in separate housings) and in electrical communication with each other.

The processing device 904 can execute one or more operations for automatically correlating well logs using descriptors. The processing device 904 can execute instructions stored in the memory device 908 to perform the operations. The processing device 904 can include one processing device or multiple processing devices. Non-limiting examples of the processing device 904 include a Field-Programmable Gate Array ("FPGA"), an application-specific integrated circuit ("ASIC"), a microprocessing device, etc.

The processing device 904 can be communicatively coupled to the memory device 908 via the bus 906. The non-volatile memory device 908 may include any type of memory device that retains stored information when powered off. Non-limiting examples of the memory device 908 include electrically erasable and programmable read-only memory ("EEPROM"), flash memory, or any other type of non-volatile memory. In some examples, at least some of the memory device 908 can include a medium from which the processing device 904 can read instructions. A computer-readable medium can include electronic, optical, magnetic, or other storage devices capable of providing the processing device 904 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 908 can include well logs 910. The well logs 910 can be communicated to the computing device 112 from one or more well tools positioned in one or more wellbores.

In some examples, the memory device 908 can include a well-log correlation engine 912. The well-log correlation engine 912 can be a software application for identifying correlations among nodes in the well logs 910. The well-log correlation engine 912 can identify the correlations by using descriptors to perform dynamic warping. In some examples, the well-log correlation engine 912 can determine the descriptors, parameters for the descriptor(s), and/or weights for the descriptors for use in dynamic warping.

In some examples, the memory device 908 can include a correlation database 914. The correlation database 914 can be a database having correlations between nodes in well logs. For example, the correlation database 914 can include an association of nodes in the well logs 910.

In some examples, the computing device 112 includes a user input device 916. The user input device 916 can represent one or more components used to input data. Examples of the user input device 916 can include a keyboard, mouse, touchpad, button, or touch-screen display, etc.

In some examples, the computing device 112 includes a display device 918. The display device 918 can represent one or more components used to output data. Examples of the display device 918 can include a liquid-crystal display (LCD), a television, a computer monitor, a touch-screen display, etc. In some examples, the user input device 916 and the display device 918 can be a single device, such as a touch-screen display.

In some examples, the computing device 112 includes a communication interface 920. The communication interface 920 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some aspects, automated well-log correlation can be performed using descriptors according to one or more of the following examples:

Example #1: A non-transitory computer readable medium can include program code for automatically correlating well logs to identify features of a stratum represented in the well logs. The program code can be executable by a processing device. The program code can cause the processing device to receive a plurality of well logs. Each well log of the plurality of well logs can indicate subterranean strata penetrated at various depths by a respective wellbore. The program code can cause the processing device to determine a combination of descriptors used to correlate a first data-point in a first well-log of the plurality of well logs to a second data-point in a second well-log of the plurality of well logs. The combination of descriptors can be determined by (i) selecting different combinations of descriptors from among a plurality of descriptors, where a descriptor can be a type of information about a data point in a well log; (ii) performing dynamic warping on the first well-log and the second well-log using the different combinations of descriptors to generate a plurality of alignments between the first well-log and the second well-log, where dynamic warping can include manipulating a shape of a well log to align the well log with another well log; and/or (iii) analyzing the plurality of alignments to determine that the combination of descriptors results in the first data-point being correlated with the second data-point. The program code can cause the processing device to correlate data points between other well logs in the plurality of well logs by performing dynamic warping using the combination of descriptors.

Example #2: The non-transitory computer readable medium of Example #1 may further include program code executable by the processing device for causing the processing device to determine the combination of descriptors by selecting a value for a parameter corresponding to at least one descriptor in the combination of descriptors.

Example #3: The non-transitory computer readable medium of any of Examples #1-2 may further include program code executable by the processing device for causing the processing device to determine the combination of descriptors by selecting a respective weight for the each descriptor in the combination of descriptors.

Example #4: The non-transitory computer readable medium of any of Examples #1-3 may feature the combination of descriptors including a shape descriptor that is indicative of one or more slopes in data before or after a data point of interest. The non-transitory computer readable medium may further include program code executable by the processing device for causing the processing device to determine the one or more slopes by: (i) determining the data point of interest in the first well-log; (ii) dividing data points before or after the data point of interest into one or more segments; and/or (iii) determining the one or more slopes based on the one or more segments. Each slope of the one or more slopes can correspond to a respective segment of the one or more segments and can be determined by performing a linear regression on respective data-points in the respective segment.

Example #5: The non-transitory computer readable medium of any of Examples #1-4 may feature the combination of descriptors including an average descriptor that is indicative of one or more averages of data before or after a data point of interest. The non-transitory computer readable medium can further include program code executable by the processing device for causing the processing device to determine the one or more averages by: (i) determining the data point of interest in the first well-log; (ii) dividing data points before or after the data point of interest into one or more segments; and/or (iii) determining the one or more averages based on the one or more segments. Each average of the one or more averages can correspond to a respective segment of the one or more segments and can be determined by averaging respective data-points in the respective segment.

Example #6: The non-transitory computer readable medium of any of Examples #1-5 may feature the combination of descriptors including a histogram descriptor that is representative of frequencies in which slopes of a plurality of data points fall into a plurality of slope ranges. The non-transitory computer readable medium can further include program code executable by the processing device for causing the processing device to determine the frequencies in which the slopes of the plurality of data points fall into the plurality of slope ranges by: (i) determining a plurality of slopes corresponding to the plurality of data points, each slope in the plurality of slopes corresponding to a respective data point in the plurality of data points; (ii) determining the plurality of slope ranges, each slope range of the plurality of slope ranges spanning a predetermined number of degrees; (iii) associating each data point in the plurality of data points with a respective slope range of the plurality of slope ranges based on a slope associated with the data point; and/or (iv) determining a number of data points associated with each slope range of the plurality of slope ranges.

Example #7: The non-transitory computer readable medium of any of Examples #1-6 may further include program code executable by the processing device for causing the processing device to determine the combination of descriptors by: (i) identifying multiple combinations of descriptors that result in the first data-point being correlated with the second data-point in an amount that is within a predetermined tolerance range; and/or (ii) selecting the combination of descriptors from among the multiple combinations of descriptors based on the combination of descriptors resulting in a closer correlation between the first data-point and the second data-point than another combination of descriptors in the multiple combinations of descriptors.

Example #8: A system can be for automatically correlate well logs to identify features of a stratum represented in the well logs. The system can include a processing device and a memory device on which instructions executable by the processing device are stored. The instructions can cause the processing device to receive a plurality of well logs. Each well log of the plurality of well logs can indicate subterranean strata penetrated at various depths by a respective wellbore. The instructions can cause the processing device to determine a combination of descriptors used to correlate a first data-point in a first well-log of the plurality of well logs to a second data-point in a second well-log of the plurality of well logs. The combination of descriptors can be determined by (i) selecting different combinations of descriptors from among a plurality of descriptors, where a descriptor can be a type of information about a data point in a well log; (ii) performing dynamic warping on the first well-log and the second well-log using the different combinations of descriptors to generate a plurality of alignments between the first well-log and the second well-log, where dynamic warping can include manipulating a shape of a well log to align the well log with another well log; and/or (iii) analyzing the plurality of alignments to determine that the combination of descriptors results in the first data-point being correlated with the second data-point. The instructions can cause the processing device to correlate data points between other well logs in the plurality of well logs by performing dynamic warping using the combination of descriptors.

Example #9: The system of Example #8 may feature the memory device further including instructions executable by the processing device for causing the processing device to determine the combination of descriptors by selecting values for at least two parameters corresponding to at least one descriptor in the combination of descriptors.

Example #10: The system of any of Examples #8-9 may feature the memory device further including instructions executable by the processing device for causing the processing device to determine the combination of descriptors by selecting a respective weight for the each descriptor in the combination of descriptors.

Example #11: The system of any of Examples #8-10 may feature the combination of descriptors including a shape descriptor that is indicative of one or more slopes in data before or after a data point of interest. The memory device may further including instructions executable by the processing device for causing the processing device to determine the one or more slopes by: (i) determining the data point of interest in the first well-log; (ii) dividing data points before or after the data point of interest into one or more segments; and/or (iii) determining the one or more slopes based on the one or more segments. Each slope of the one or more slopes can correspond to a respective segment of the one or more segments and can be determined by performing a linear regression on respective data-points in the respective segment.

Example #12: The system of any of Examples #8-11 may feature the combination of descriptors including an average descriptor that is indicative of one or more averages of data before or after a data point of interest. The memory device may further including instructions executable by the processing device for causing the processing device to determine the one or more averages by: (i) determining the data point of interest in the first well-log; (ii) dividing data points before or after the data point of interest into one or more segments; and/or (iii) determining the one or more averages based on the one or more segments. Each average of the one or more averages can correspond to a respective segment of the one or more segments and can be determined by averaging respective data-points in the respective segment.

Example #13: The system of any of Examples #8-12 may feature the combination of descriptors including a histogram descriptor that is representative of frequencies in which slopes of a plurality of data points fall into a plurality of slope ranges. The memory device may further including instructions executable by the processing device for causing the processing device to determine the frequencies in which the slopes of the plurality of data points fall into the plurality of slope ranges by: (i) determining a plurality of slopes corresponding to the plurality of data points, each slope in the plurality of slopes corresponding to a respective data point in the plurality of data points; (ii) determining the plurality of slope ranges, each slope range of the plurality of slope ranges spanning a predetermined number of degrees; (iii) associating each data point in the plurality of data points with a respective slope range of the plurality of slope ranges based on a slope associated with the data point; and/or (iv) determining a number of data points associated with each slope range of the plurality of slope ranges.

Example #14: The system of any of Examples #8-13 may feature the memory device may further including instructions executable by the processing device for causing the processing device to determine the combination of descriptors by: (i) identifying multiple combinations of descriptors that result in the first data-point being correlated with the second data-point in an amount that is within a predetermined tolerance range; and/or (ii) selecting the combination of descriptors from among the multiple combinations of descriptors based on the combination of descriptors resulting in a closer correlation between the first data-point and the second data-point than another combination of descriptors in the multiple combinations of descriptors.

Example #15: A method can be for automatically correlating well logs to identify features of a stratum represented in the well logs. The method can include receiving a plurality of well logs. Each well log of the plurality of well logs can indicate subterranean strata penetrated at various depths by a respective wellbore. The method can include determining a combination of descriptors used to correlate a first data-point in a first well-log of the plurality of well logs to a second data-point in a second well-log of the plurality of well logs. The combination of descriptors can be determined by (i) selecting different combinations of descriptors from among a plurality of descriptors, where a descriptor can be a type of information about a data point in a well log; (ii) performing dynamic warping on the first well-log and the second well-log using the different combinations of descriptors to generate a plurality of alignments between the first well-log and the second well-log, where dynamic warping can include manipulating a shape of a well log to align the well log with another well log; and/or (iii) analyzing the plurality of alignments to determine that the combination of descriptors results in the first data-point being correlated with the second data-point. The method can include correlating data points between other well logs in the plurality of well logs by performing dynamic warping using the combination of descriptors. Some or all of the method steps can be performed by a processing device.

Example #16: The method of Example #15 may further include determining the combination of descriptors by selecting values for at least three parameters corresponding to at least one descriptor in the combination of descriptors.

Example #17: The method of any of Examples #15-16 may further include determining the combination of descriptors by selecting a respective weight for the each descriptor in the combination of descriptors.

Example #18: The method of any of Examples #15-17 may feature the combination of descriptors including a shape descriptor that is indicative of one or more slopes in data before or after a data point of interest. The method may further include determining the one or more slopes by: (i) determining the data point of interest in the first well-log; (ii) dividing data points before or after the data point of interest into one or more segments; and/or (iii) determining the one or more slopes based on the one or more segments. Each slope of the one or more slopes can correspond to a respective segment of the one or more segments and can be determined by performing a linear regression on respective data-points in the respective segment.

Example #19: The method of any of Examples #15-18 may feature the combination of descriptors including an average descriptor that is indicative of one or more averages of data before or after a data point of interest. The method may further include determining the one or more averages by: (i) determining the data point of interest in the first well-log; (ii) dividing data points before or after the data point of interest into one or more segments; and/or (iii) determining the one or more averages based on the one or more segments. Each average of the one or more averages can correspond to a respective segment of the one or more segments and can be determined by averaging respective data-points in the respective segment.

Example #20: The method of any of Examples #15-19 may feature the combination of descriptors including a histogram descriptor that is representative of frequencies in which slopes of a plurality of data points fall into a plurality of slope ranges. The method can include determining the frequencies in which the slopes of the plurality of data points fall into the plurality of slope ranges by: (i) determining a plurality of slopes corresponding to the plurality of data points, each slope in the plurality of slopes corresponding to a respective data point in the plurality of data points; (ii) determining the plurality of slope ranges, each slope range of the plurality of slope ranges spanning a predetermined number of degrees; (iii) associating each data point in the plurality of data points with a respective slope range of the plurality of slope ranges based on a slope associated with the data point; and/or (iv) determining a number of data points associated with each slope range of the plurality of slope ranges.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer readable medium comprising program code that is executable by a processing device for causing the processing device to:
receive a plurality of well logs, each well log of the plurality of well logs indicating subterranean strata penetrated at various depths by a respective wellbore;
determine a particular combination of descriptors that is to be used in correlating well logs to one another, wherein the particular combination of descriptors is determined by:
selecting different combinations of descriptors from among a plurality of descriptors, each descriptor in the plurality of descriptors being of a different type than the other descriptors in the plurality of descriptors;
selecting a pair of well logs from the plurality of well logs;
repeatedly performing dynamic warping on the pair of well logs using the different combinations of descriptors to generate a plurality of alignments between the pair of well logs, each alignment in the plurality of alignments being generated by performing dynamic warping on the pair of well logs using a different combination of descriptors, wherein dynamic warping includes manipulating a shape of a well log to align the well log with another well log; and
analyzing the plurality of alignments to determine that the particular combination of descriptors results in at least one pair of data points in the pair of well logs being correlated to one another; and
based on identifying the particular combination of descriptors, correlate data points between other well logs in the plurality of well logs by performing dynamic warping using the particular combination of descriptors, the other well logs being different from the pair of well logs.

2. The non-transitory computer readable medium of claim 1, further comprising program code executable by the processing device for causing the processing device to determine the particular combination of descriptors by selecting a value for a parameter corresponding to at least one descriptor in the particular combination of descriptors.

3. The non-transitory computer readable medium of claim 2, further comprising program code executable by the processing device for causing the processing device to determine the particular combination of descriptors by selecting a respective weight for each descriptor in the particular combination of descriptors.

4. The non-transitory computer readable medium of claim 3, wherein the particular combination of descriptors comprises a shape descriptor that is indicative of one or more slopes in data before or after a data point of interest, and further comprising program code executable by the processing device for causing the processing device to determine the one or more slopes by:
determining the data point of interest in a well log of the pair of well logs;
dividing data points before or after the data point of interest into one or more segments; and
determining the one or more slopes based on the one or more segments, each slope of the one or more slopes corresponding to a respective segment of the one or more segments and being determined by performing a linear regression on respective data-points in the respective segment.

5. The non-transitory computer readable medium of claim 4, wherein the particular combination of descriptors comprises an average descriptor that is indicative of one or more averages of data before or after the data point of interest, and further comprising program code executable by the processing device for causing the processing device to:
determine the one or more averages based on the one or more segments, each average of the one or more averages corresponding to a respective segment of the one or more segments and being determined by averaging respective data-points in the respective segment.

6. The non-transitory computer readable medium of claim 3, wherein the particular combination of descriptors comprises a histogram descriptor that is representative of frequencies in which slopes of a plurality of data points fall into a plurality of slope ranges, and further comprising program code executable by the processing device for causing the processing device to determine the frequencies in which the slopes of the plurality of data points fall into the plurality of slope ranges by:
determining a plurality of slopes corresponding to the plurality of data points, each slope in the plurality of slopes corresponding to a respective data point in the plurality of data points;
determining the plurality of slope ranges, each slope range of the plurality of slope ranges spanning a predetermined number of degrees;
associating each data point in the plurality of data points with a respective slope range of the plurality of slope ranges based on a slope associated with the data point; and
determining a number of data points associated with each slope range of the plurality of slope ranges.

7. The non-transitory computer readable medium of claim 3, further comprising program code executable by the processing device for causing the processing device to determine the particular combination of descriptors by:
identifying multiple combinations of descriptors that result in a first data-point in the pair of well logs being correlated to a second data-point in the pair of well logs by an amount that is within a predetermined tolerance range; and
selecting the particular combination of descriptors from among the multiple combinations of descriptors based on the particular combination of descriptors resulting in a closer correlation between the first data-point and the second data-point than another combination of descriptors in the multiple combinations of descriptors.

8. A system comprising:
a processing device; and
a memory device on which instructions executable by the processing device are stored for causing the processing device to:

receive a plurality of well logs, each well log of the plurality of well logs indicating subterranean strata penetrated at various depths by a respective wellbore;

determine a particular combination of descriptors that is to be used in correlating well logs to one another, wherein the particular combination of descriptors is determined by:

selecting different combinations of descriptors from among a plurality of descriptors, each descriptor in the plurality of descriptors being of a different type than the other descriptors in the plurality of descriptors;

selecting a pair of well logs from the plurality of well logs;

repeatedly performing dynamic warping on the pair of well logs using the different combinations of descriptors to generate a plurality of alignments between the pair of well logs, each alignment in the plurality of alignments being generated by performing dynamic warping on the pair of well logs using a different combination of descriptors, wherein dynamic warping includes manipulating a shape of a well log to align the well log with another well log; and analyzing the plurality of alignments to determine that the particular combination of descriptors results in at least one pair of data points in the pair of well logs being correlated to one another; and based on identifying the particular combination of descriptors, correlate data points between other well logs in the plurality of well logs by performing dynamic warping using the particular combination of descriptors, the other well logs being different from the pair of well logs.

9. The system of claim 8, wherein the memory device further comprises instructions executable by the processing device for causing the processing device to determine the particular combination of descriptors by selecting values for at least two parameters corresponding to at least one descriptor in the particular combination of descriptors.

10. The system of claim 8, wherein the memory device further comprises instructions executable by the processing device for causing the processing device to determine the particular combination of descriptors by selecting a respective weight for each descriptor in the particular combination of descriptors.

11. The system of claim 8, wherein the particular combination of descriptors comprises a shape descriptor that is indicative of one or more slopes in data before or after a data point of interest, and wherein the memory device further comprises instructions executable by the processing device for causing the processing device to determine the one or more slopes by:

determining the data point of interest in a well log of the pair of well logs;

dividing data points before or after the data point of interest into one or more segments; and determining the one or more slopes based on the one or more segments, each slope of the one or more slopes corresponding to a respective segment of the one or more segments and being determined by performing a linear regression on respective data-points in the respective segment.

12. The system of claim 8, wherein the particular combination of descriptors comprises an average descriptor that is indicative of one or more averages of data before or after a data point of interest, and wherein the memory device further comprises instructions executable by the processing device for causing the processing device to determine the one or more averages by:

determining the data point of interest in a well log of the pair of well logs;

dividing data points before or after the data point of interest into one or more segments; and determine the one or more averages based on the one or more segments, each average of the one or more averages corresponding to a respective segment of the one or more segments and being determined by averaging respective data-points in the respective segment.

13. The system of claim 8, wherein the particular combination of descriptors comprises a histogram descriptor that is representative of frequencies in which slopes of a plurality of data points fall into a plurality of slope ranges, and wherein the memory device further comprises instructions executable by the processing device for causing the processing device to determine the frequencies in which the slopes of the plurality of data points fall into the plurality of slope ranges by:

determining a plurality of slopes corresponding to the plurality of data points, each slope in the plurality of slopes corresponding to a respective data point in the plurality of data points;

determining the plurality of slope ranges, each slope range of the plurality of slope ranges spanning a predetermined number of degrees;

associating each data point in the plurality of data points with a respective slope range of the plurality of slope ranges based on a slope associated with the data point; and determining a number of data points associated with each slope range of the plurality of slope ranges.

14. The system of claim 8, wherein the memory device further comprises instructions executable by the processing device for causing the processing device to determine the particular combination of descriptors by:

identifying multiple combinations of descriptors that result in a first data-point in the pair of well logs being correlated to a second data-point in the pair of well logs by an amount that is within a predetermined tolerance range; and selecting the particular combination of descriptors from among the multiple combinations of descriptors based on the particular combination of descriptors resulting in a closer correlation between the first data-point and the second data-point than another combination of descriptors in the multiple combinations of descriptors.

15. A method comprising:

receiving, by a processing device, a plurality of well logs, each well log of the plurality of well logs indicating subterranean strata penetrated at various depths by a respective wellbore;

determining, by the processing device, a particular combination of descriptors that is to be used in correlating well logs to one another, wherein the particular combination of descriptors is determined by:

selecting different combinations of descriptors from among a plurality of descriptors, each descriptor in the plurality of descriptors being of a different type than the other descriptors in the plurality of descriptors;

selecting a pair of well logs from the plurality of well logs;

repeatedly performing dynamic warping on the pair of well logs using the different combinations of descriptors to generate a plurality of alignments between the pair of well logs, each alignment in the plurality of alignments being generated by performing dynamic time warping on the pair of well logs using a different combination of descriptors, wherein dynamic warping includes manipulating a shape of a well log to align the well log with another well log; and analyzing the plurality of alignments to determine that the particular combination of descriptors results in at least one pair of data points in the pair of well logs being correlated to one another; and based on identifying the particular combination of descriptors, correlating, by the processing device, data points between other well logs in the plurality of well logs by performing dynamic warping using the particular combination of descriptors, the other well logs being different from the pair of well logs.

16. The method of claim 15, further comprising determining the particular combination of descriptors by selecting values for at least three parameters corresponding to at least one descriptor in the particular combination of descriptors.

17. The method of claim 15, further comprising determining the particular combination of descriptors by selecting a respective weight for each descriptor in the particular combination of descriptors.

18. The method of claim 15, wherein the particular combination of descriptors comprises a shape descriptor that is indicative of one or more slopes in data before or after a data point of interest, and further comprising determining the one or more slopes by:

determining the data point of interest in a well log of the pair of well logs;

dividing data points before or after the data point of interest into one or more segments; and determining the one or more slopes based on the one or more segments, each slope of the one or more slopes corresponding to a respective segment of the one or more segments and being determined by performing a linear regression on respective data-points in the respective segment.

19. The method of claim 15, wherein the particular combination of descriptors comprises an average descriptor that is indicative of one or more averages of data before or after a data point of interest, and further comprising determining the one or more averages by:

determining the data point of interest in a well log of the pair of well logs;

dividing data points before or after the data point of interest into one or more segments; and determine the one or more averages based on the one or more segments, each average of the one or more averages corresponding to a respective segment of the one or more segments and being determined by averaging respective data-points in the respective segment.

20. The method of claim 15, wherein the particular combination of descriptors comprises a histogram descriptor that is representative of frequencies in which slopes of a plurality of data points fall into a plurality of slope ranges, and further comprising determining the frequencies in which the slopes of the plurality of data points fall into the plurality of slope ranges by:

determining a plurality of slopes corresponding to the plurality of data points, each slope in the plurality of slopes corresponding to a respective data point in the plurality of data points;

determining the plurality of slope ranges, each slope range of the plurality of slope ranges spanning a predetermined number of degrees;

associating each data point in the plurality of data points with a respective slope range of the plurality of slope ranges based on a slope associated with the data point; and determining a number of data points associated with each slope range of the plurality of slope ranges.

* * * * *